United States Patent
Amaddeo et al.

(10) Patent No.: US 6,624,233 B2
(45) Date of Patent: Sep. 23, 2003

(54) LOW ROLLING RESISTANCE TIRE FOR VEHICLES

(75) Inventors: Angela Amaddeo, Arienzo (IT); Luciano Garro, Ornago (IT); Fabrizia Sala, Annone Brianza (IT)

(73) Assignee: Pirelli Pneumatici S.p.A., Milan (IT)

( * ) Notice: Subject to any disclaimer, the term of this patent is extended or adjusted under 35 U.S.C. 154(b) by 0 days.

(21) Appl. No.: 09/996,589

(22) Filed: Nov. 30, 2001

(65) Prior Publication Data
US 2002/0143096 A1 Oct. 3, 2002

Related U.S. Application Data (63) Continuation of application No. PCT/EP00/04986, filed on May 30, 2000.
(60) Provisional application No. 60/145,952, filed on Jul. 28, 1999.

(30) Foreign Application Priority Data

May 31, 1999 (EP) .............................. 99830337

(51) Int. Cl.[7] .............................. C08K 3/36; C08K 3/04; B60C 1/00; B60C 9/02
(52) U.S. Cl. .................. 524/493; 524/425; 524/437; 524/444; 524/449; 524/495; 524/847; 152/209.1; 152/209.5
(58) Field of Search ................. 524/493, 425, 524/437, 444, 447, 495, 847; 152/209.1

(56) References Cited

U.S. PATENT DOCUMENTS

| 3,451,988 A | | 6/1969 | Langer, Jr. et al. ........ 260/94.6 |
| 4,264,753 A | | 4/1981 | Halasa et al. ................ 526/180 |
| 4,708,859 A | | 11/1987 | Chevallier |
| 4,722,377 A | * | 2/1988 | Dobson |
| 5,089,554 A | | 2/1992 | Bomo et al. |
| 5,227,425 A | * | 7/1993 | Rauline |
| 5,409,969 A | * | 4/1995 | Hamada |
| 5,693,712 A | * | 12/1997 | Urban et al. |
| 5,723,529 A | * | 3/1998 | Bernard et al. |
| 5,846,506 A | | 12/1998 | Esch et al. |
| 5,925,708 A | | 7/1999 | Esch et al. |
| 6,127,472 A | * | 10/2000 | Kobayashi et al. |
| 6,211,271 B1 | * | 4/2001 | Garro et al. |

FOREIGN PATENT DOCUMENTS

| EP | 0 157 703 A1 | 10/1985 |
| EP | 0 447 066 A1 | 9/1991 |
| EP | 0 501 227 A1 | 9/1992 |
| EP | 0 520 862 A1 | 12/1992 |
| EP | 0 641 823 A1 | 3/1995 |
| EP | 0 647 591 A1 | 4/1995 |
| EP | 0 735 088 A1 | 10/1996 |

* cited by examiner

*Primary Examiner*—Tae H. Yoon
(74) *Attorney, Agent, or Firm*—Finnegan, Henderson, Farabow, Garrett & Dunner, L.L.P.

(57) ABSTRACT

A low rolling resistance tire for vehicles includes a carcass structure, a belt structure coaxially extending around the carcass structure, and a tread coaxially extending around the belt structure and being externally provided with a rolling surface designed to contact the ground. The tread includes a vulcanized polymer base having at least a first silica-based reinforcing filler. The first silica-based reinforcing filler has an average projected area of aggregates, measured before incorporation into the polymer base, lower the 20,000 nm$^2$, a dispersion index in the polymer base not lower than 97%, and an average projected area of the aggregates, measured after incorporation into the polymer base, between 8,500 nm$^2$ and 18,000 nm$^2$.

27 Claims, 1 Drawing Sheet

LOW ROLLING RESISTANCE TIRE FOR VEHICLES

CROSS-REFERENCE TO RELATED APPLICATIONS

This application is a continuation of International Patent Application No. PCT/EP00/04986, filed May 30, 2000, in the European Patent Office, the contents of which are relied upon and incorporated herein by reference; additionally, Applicants claim the right of priority under 35 U.S.C. §119(a)–(d) based on patent application No. 99830337.4, filed May 31, 1999, in the European Patent Office; further, Applicants claim the benefit under 35 U.S.C. §119(e) based on prior-filed, copending provisional application No. 60/145,952, filed Jul. 28, 1999, in the U.S. Patent and Trademark Office.

BACKGROUND OF THE INVENTION

The present invention relates to a tire for vehicles provided with a tread having a low rolling resistance.

The invention also relates to a premolded tread, in particular for covering worn tires, having a low rolling resistance, as well as to a method for reducing the rolling resistance of vehicle tires.

DESCRIPTION OF THE RELATED ART

As is known, in the field of vehicle tire manufacture, research is increasingly devoted to finding how to reduce as much as possible the rolling resistance of tires.

To this aim, it has been proposed in the art to use rubber compositions having a low content of carbon black in the manufacture of the tire tread.

In these rubber compositions, carbon black is partly or entirely replaced by the so-called "white" inorganic reinforcing fillers, such as gypsum, talc, kaolin, bentonite, titanium dioxide, various types of silicates, and in particular silica, as disclosed, for instance, in European Patent EP 0 501 227.

In particular, in order to reduce the rolling resistance of the tire without significantly affecting its wear resistance and wet skid resistance, the constant teaching of the prior art in this field is to use silica having a so-called high surface area, i.e. silica having a BET surface area generally greater than 130 $m^2/g$.

According to the constant teaching of the prior art, in fact, the use of silicas having a high surface area allows to improve the mechanical properties of the tread, such as for instance tensile resistance, elongation, tear resistance, and in particular abrasion resistance.

Notwithstanding these advantageous effects, however, the use of silica-based reinforcing fillers involves several drawbacks substantially associated to the poor affinity of the same with the polymer base of the rubber compositions employed in the tire manufacture. Such poor affinity requires, in fact, the use of suitable coupling agents that are able to chemically bond silica to the polymer matrix.

However, the need of using such coupling agents poses a limit to the maximum temperature that may be attained during the steps of mixing and thermal-mechanical working of the rubber composition, on pain of an irreversible thermal degradation of the coupling agent.

But the respect of the aforementioned temperature constraint involves, in its turn, a marked reduction in the very mechanical mixing action that is of the essential—when using silica having a high surface area—for an optimum dispersion of the silica in the polymer matrix, as stressed by the aforementioned European Patent EP 0 501 227.

According to the teaching of this patent, in fact, it is possible to achieve a uniform dispersion in the polymer base of the silica having a high surface area only when the rubber composition is submitted to a thermal-mechanical working which is capable to reduce the projected area of silica aggregates from a starting value greater than 8500 $nm^2$, shown by silica per se, to an end value comprised between 7000 and 8400 $nm^2$, after a suitable thermal-mechanical working.

On the other hand, the insufficient dispersion of silica in the rubber composition which would ensue due to an insufficient thermal-mechanical working per se unable to comply with the aforementioned constraint of projected area of the silica aggregates, would cause, in its turn, the worsening of those very mechanical properties of the tread, and in the first place rolling resistance and abrasion resistance, that should be improved or maintained.

SUMMARY OF THE INVENTION

The technical problem underlying the present invention is that of providing a tire for vehicles provided with a tread including silica as reinforcing filler, which has a reduced rolling resistance, while keeping wear resistance and wet skid resistance substantially unaltered, and which allows at the same time to overcome the plant and process constraints associated to the need of reducing the projected area of the aggregates under 8400 $nm^2$ in order to achieve the desired homogeneous dispersion of silica, according to the teachings of the aforementioned prior art.

According to the invention, the Applicant has surprisingly found that it is possible to achieve the desired optimum compromise between rolling resistance, wear resistance and wet skid resistance even by using a silica-based reinforcing filler having a low surface area thanks to a particular combination of average projected area of the aggregates as measured before and after incorporation into the polymer base and dispersibility of the same in the polymer base of the tread.

More specifically, the Applicant has found that a silica-based reinforcing filler having a low surface area may be thoroughly dispersed in the vulcanized polymer base of the tread of a vehicle tire while still showing a projected area of the aggregates that exceeds 8500 $nm^2$, i.e. greater—considering an average margin in the experimental measurement of the same of ±100 $nm^2$—than the aforementioned maximum limit of 8400 $nm^2$ taught by the prior art.

Besides, the Applicant has surprisingly found that such silica-based reinforcing fillers having a low surface area may be homogeneously dispersed in the vulcanized polymer base of the tread, reaching the above value of the dispersion index also in the absence of an exceedingly high thermal-mechanical working of the rubber compositions.

According to a first aspect of the invention, the aforementioned technical problem is solved by a low rolling resistance tire for vehicles as defined in attached claim 1.

In the following description and in the appended claims, the term: "dispersion index", is used to indicate the percentage of dispersed silica particles with respect to the total number of silica particles included in the polymer base of the tread. Conventionally, the silica is considered as dispersed when it is present in particle aggregates having a diameter smaller than 7 μm.

The Applicant has surprisingly found that by incorporating and homogeneously dispersing in the polymer base a silica having a particular combination of surface area, average projected area of the aggregates as measured before and after incorporation into the polymer base, it is possible on the one hand to further reduce the rolling resistance of the tire without adversely affecting wear resistance and wet skid resistance and, on the other hand, to reduce the thermal-mechanical working to be imparted to the rubber composition to obtain a good dispersion of said filler.

The Applicant has in fact found that in order to achieve the aforementioned advantageous effects it is not necessary to employ—as constantly suggested by the prior art—particles having a high surface area and characterized by a reduced particle size and, as such, difficult to be homogeneously dispersed in the polymer base of the tread, but it is possible to effectively use silicas having a low surface area, characterized by particles having a greater size compared to silicas having a high surface area, and requiring with respect to the latter a lower thermal-mechanical working to achieve a suitable dispersion level in the polymer base of the tread.

Additionally, since during the incorporation step of the silica having a low surface area in the polymer base a temperature increase occurs that is lower than that reached by the processes and apparatuses of the prior art, the risks of thermally degrading the coupling agent of the silica are advantageously reduced, while imparting a strong thermal-mechanical action in the step of silica incorporation in the polymer base.

Preferably, the silica-based reinforcing filler has the following properties:
- an average projected area of the aggregates as measured before incorporation into the polymer base comprised between 9000 and 18000 nm$^2$ and, still more preferably, between 10000 and 15000 nm$^2$;
- a dispersion index not lower than 99% and, still more preferably, not lower than 99.5%;
- an average projected area of the aggregates as measured after incorporation into the polymer base comprised between 9000 and 15000 nm$^2$ and, still more preferably, between 10000 and 12000 nm$^2$;
- a BET surface area (measured according to ISO standard 5794/1) not greater than 130 m$^2$/g and, still more preferably, not greater than 110 m$^2$/g, a surface area measured by CTAB absorption according to ISO standards 6810 comprised between 80 and 130 m$^2$/g and, still more preferably, comprised between 90 and 120 m$^2$/g;
- a mean aggregate size measured by photon correlation spectroscopy lower than 350 nm, more preferably between 120 and 250 nm and still more preferably, between 160 and 200 nm;

For the purposes of the invention, the silica-based reinforcing filler having a low surface area comprises silica obtained by precipitation, as disclosed, for instance, in European patent EP 0 157 703. Silica may possibly be aluminium doped, as disclosed, for instance, in European patent application EP 0 735 088.

The silica-based reinforcing filler having a low surface area of the invention, furthermore, may be in the form of powder, granules, extrudates or spherical beads.

The Applicant has found that readily-dispersible silica-based reinforcing filler of preferred use are silicas having a particular physical form, i.e. silicas in the form of substantially spherical beads.

In the following description and in the appended claims, the term: silica in the form of substantially spherical beads is used to indicate a silica essentially constituted by spheroidal particulates obtained by precipitation. Such a type of silica may also be designated in the art with the term micropearls or MP.

Suitable silicas of this type are available on the market and a precipitation process suitable to obtain silicas having the required physical form is disclosed, for instance, in European patent application EP 0 520 862.

Preferably, the silica in the form of substantially spherical beads has a mean particle size of at least 80 microns, more preferably between 80 and 300 microns and still more preferably, between 100 and 250 microns.

According to an alternative embodiment of the invention, the polymer base comprises a predetermined amount of a second silica-based reinforcing filler.

For the purposes of the invention, this second silica-based reinforcing filler may be silica having a high surface area of a type known per se, such as that disclosed, for instance, in European patent application EP-A-0 501 227.

Preferably, the second silica-based reinforcing filler has a BET surface area (measured according to ISO standard 5794/1) comprised between 130 and 200 m$^2$/g, still more preferably between 150 and 180 m$^2$/g, a surface area measured by CTAB absorption according to ISO standards 6810 comprised between 130 and 200 m$^2$/g, still more preferably between 140 and 170 m$^2$/g.

According to the invention, the total amount of silica-based reinforcing filler is comprised between 20 and 120 parts by weight per 100 parts by weight of polymer base.

Preferably, the total amount of silica-based reinforcing filler is comprised between 30 and 100 parts by weight per 100 parts by weight of polymer base, still more preferably comprised between 50 and 90 parts by weight per 100 parts by weight of polymer base.

According to the invention, if the polymer base comprises both types of silica-based reinforcing fillers—namely, low and high surface area—the minimum amount of silica having a low surface area is preferably of at least 50% by weight of the total amount of silica-based reinforcing filler.

Preferably, the polymer base of the tread further comprises an additional reinforcing filler selected from those commonly used in the field, such as for instance: carbon black, alumina, aluminosilicates, calcium carbonate, kaolin and the like.

The types of carbon black conventionally used in the art and which may be employed in the tire tread of the invention, comprise those designated by the ASTM standards as N110, N121, N220, N231, N234, N242, N239, N299, N315, N236, N330, N332, N339, N347, N351, N358 and N375.

Preferably, the carbon black-based reinforcing filler has a DBP absorption value measured according to ISO standards 4656-1 of about 80 ml/100 g, and a surface area, measured by CTAB absorption according to ISO standards 6810, not higher than 80 m$^2$/g.

For the purposes of the invention, such carbon black-based reinforcing filler is preferably comprised between 0 and 100 parts by weight per 100 parts by weight of polymer base, more preferably, between 0 and 40 parts by weight per 100 parts by weight of polymer base. The weight ratio between the total amount of silica-based reinforcing filler and the amount of additional reinforcing filler should be such as to ensure the desired low rolling resistance; in particular such ratio is preferably comprised between 0.5 and 15 and, still more preferably, between 1 and 10.

According to the invention, the rubber composition employed to manufacture the tire tread of the invention may further incorporate a suitable coupling agent, capable of interacting with silica and of binding the latter to the polymer base during the vulcanization of the same.

Coupling agents of preferred use are the silane-based ones and have the following structural formula:

$$(R)_3-Si-C_nH_{2n}X \qquad (I)$$

wherein:

R is an alkyl or an alkoxy group comprising 1 to 4 carbon atoms or a chlorine atom, n is an integer of between 1 and 6, and X is a group selected from —$Si_m$—$C_nH_{2n}$—Si—$(R)_3$, nitroso, mercapto, amino, epoxy, vinyl, imido, a chlorine atom, one or more sulfur atoms, or a $S_mY$ group, wherein Y is selected from the following functional groups:

wherein m and n are an integer comprised between 1 and 6, and R is an alkyl or an alkoxy group comprising 1 to 4 carbon atoms or a chlorine atom.

Particularly preferred among them is the silane coupling agent Si69 [bis(3-triethoxysilyl-propyl)tetrasulphide] (DEGUSSA), as such or in a suitable mixture with a moderate quantity of inert filler (for instance carbon black or the same silica), so as to facilitate its incorporation into the rubber composition, or X50S (Degussa) (50% carbon black, 50% silane).

Preferably, the polymer base used for the manufacture of the tire tread includes unsaturated-chain polymers or copolymers, either natural or synthetic, the latter being obtained by solution or emulsion polymerization of conjugated dienes and aliphatic or aromatic vinyl monomers.

More particularly, the aforementioned polymer base comprises copolymers obtained by polymerization of at least one conjugated diolefin with at least one aromatic vinyl hydrocarbon, said copolymers having a glass transition temperature comprised between 0° and –80° C. and including a total amount of aromatic vinyl hydrocarbon comprised between 5% and 50% by weight based on the total weight of the same.

For the purposes of the invention, the conjugated diolefin of preferred use is selected from the group comprising: 1,3-butadiene, isoprene, 2,3-dimethyl-1,3-butadiene, 1,3-pentadiene, 1,3-hexadiene, and mixtures thereof, while the aromatic vinyl hydrocarbon of preferred use is selected from the group comprising: styrene, α-methyl-styrene, p-methyl-styrene, vinyl-toluene, vinyl-naphthalene, vinyl-pyridine, and mixtures thereof.

Preferably, the aforementioned copolymers are obtained by solution polymerization of the conjugated polyolefin with the aromatic vinyl hydrocarbon. Still more preferably, the aforementioned copolymers are obtained by solution polymerization of 1,3-butadiene and styrene according to methods known per se.

For the purposes of the invention, the aforementioned polymer base may further comprise natural rubber, polybutadiene, polyisoprene, polychloroprene, possibly halogenated isoprene-isobutene copolymers, butadiene-acrylonitrile copolymers, styrene-butadiene-isoprene terpolymers, and ethylene-propylene-diene terpolymers.

In a particularly preferred embodiment, the polymer base includes at least 30% by weight, more preferably from 45 to 90% by weight of a butadiene/styrene copolymer prepared in solution (S-SBR), on the total dry weight of the polymer base.

In a particularly preferred embodiment, such a butadiene/styrene copolymer is of the so-called "high vinyl" type, i.e. wherein at least 50% by weight of the conjugated diolefin (butadiene) polymerizes in 1,2 form with the aromatic vinyl hydrocarbon (styrene) in such a manner as to have an amount of an olefin fraction having a 1,2 structure comprised between 30% and 70% by weight based on the total weight of the same.

In the following description and in the appended claims, the term: 1,2-polymerization, is used to indicate a particular stereospecific polymerization method between the conjugated diolefin and the vinyl aromatic hydrocarbon by means of which the formation of a copolymer is obtained in which the olefin fraction comprises a prefixed quantity of side-chain vinyl groups —CH=$CH_2$ bound to the polymer chain.

Methods for the 1,2-polymerization of conjugated olefins are well known in the art and are described, for instance, in U.S. Pat. Nos. 3,451,988 and 4,264,753.

In an embodiment, at least one of the aforementioned copolymers is a copolymer suitably modified by means of silane groups Si—O—having chemical and structural features, as well as preparation techniques known per se, such as for instance those disclosed by European patent application EP-A-0 447 066.

In this embodiment of the invention, the copolymer including silane groups has a glass transition temperature not lower than –50° C., and is obtainable by polymerization in the presence of an organic metal initiator of 1,4-butadiene or a 1,4-butadiene/styrene copolymer with a silane compound having the following structural formula:

$$X_i-Si-(OR)_j-R'_{4-i-j} \qquad (II)$$

wherein X is a halogen atom selected from the group comprising chlorine, bromine and iodine, R and R' are independently an alkyl group, an aryl group, a vinyl group or a halogenated alkyl group having from 1 to 20 carbon atoms, j is an integer between 1 and 4, i is an integer between 0 and 2, the sum of i and j ranging between 2 and 4.

Preferably, the aforesaid silane compound comprises non-hydrolytic OR groups, i.e., the OR group is a non-hydrolytic alkoxy, aryloxy or cycloalkoxy group having 4 to 20 carbon atoms. Preferably, the R radical in the OR group is a hydrocarbon residue wherein 3 carbon atoms are bonded to a carbon atom in α-position, a hydrocarbon residue having not less than one carbon atom which is bonded in β-position to a carbon atom or an aromatic hydrocarbon residue, such as for instance a phenyl or tolyl group.

Preferably, the aforesaid silane compound comprises non-hydrolytic OR groups, i.e. the OR group is a non-hydrolytic alkoxy, aryloxy or cycloalkoxy group having from 4 to 20 carbon atoms. Preferably, the R radical in the OR group is a hydrocarbon residue wherein 3 carbon atoms are bonded to a carbon atom in α-position, a hydrocarbon residue having not less than one carbon atom which is bonded in β-position to a carbon atom or an aromatic hydrocarbon residue, such as for instance a phenyl or tolyl group.

Among the alkoxy group-comprising silane compounds suitable for the purposes of the invention, those preferred are tetrakis(2-ethylethoxy)silane, tetraphenoxy silane, methyltris(2-ethylethoxy)silane, ethyltris(2-ethylethoxy) silane, ethyltrisphenoxy silane, vinyltris(2-ethylhexylethoxy)silane, vinyltriphenoxy silane, methylvinylbis(2-ethylhexyletoxy)silane, ethylvinylbiphenoxy silane, monomethyltriphenoxy silane, dimethyldiphenoxy silane, monoethyltriphenoxy silane, diethyldiphenoxy silane, phenyltriphenoxy silane, diphenyldiphenoxy silane, and the like.

Among the aryloxy group-comprising silane compounds suitable for the purposes of the invention those preferred are tetraphenoxy silane, ethyltriphenoxy silane, vinyltriphenoxy silane, dimethyldiphenoxy silane, monoethyltriphenoxy silane, diethyldiphenoxy silane, phenyltriphenoxy silane, diphenyldiphenoxy silane, and the like.

Suitable silane compounds comprising a halogen atom and a non-hydrolytic OR group with 4 carbon atoms comprise tri-t-butoxy-monochloro silane, dichloro-di-t-butoxy silane, di-t-butoxy-diiodo silane, and the like, while suitable silane compounds comprising a halogen atom and a non-hydrolytic OR group with 5 carbon atoms comprise triphenoxymonochloro silane, monochloromethyldiphenoxy silane, monochloromethylbis(2-ethylhexyloxy) silane, monobromoethyldiphenoxy silane, monobromovinyldiphenoxy silane, monobromoisopropenylbis(2-ethylhexyloxy) silane, ditolyloxydichloro silane, diphenoxydiiodo silane, methyltris(2-methylbutoxy) silane, vinyltris(2-methylbutoxy) silane, vinyltris(3-metylbutoxy) silane, tetrakis(2-ethylhexyloxy) silane, tetraphenoxy silane, methyltris(2-ethylhexyloxy) silane, ethyltriphenoxy silane, vinyltris (2-ethylhexyloxy) silane, vinyltriphenoxy silane, methylvinylbis(2-ethylhexyloxy) silane, ethylvinyldiphenoxy silane, and the like.

Suitable silane compounds comprising a halogen atom and an OR aryloxy group include triphenoxymonochloro silane, monochloromethyldiphenoxy silane, monobromoethyldiphenoxy silane, ditolyldichloro silane, diphenoxydiiodo silane and the like.

Among these silane compounds, those wherein i is 0 or 1, in particular tetraphenoxy silane and monomethyltriphenoxy silane, are preferred.

For the purposes of the invention, the silane compounds may be used either alone or in mixture with one another.

In addition to the above described ingredients, one or more non-cross-linking ingredients, known per se and necessary to impart the composition the necessary mechanical and workability characteristics, are incorporated in the rubber composition used to manufacture the tire tread of the invention.

In particular, such ingredients are selected from the group comprising plasticizers, working adjuvants, anti-oxidants, age-retarding agents, etc.

Furthermore, each of such ingredients is selected in amounts and ratios which may be easily determined by those skilled in the art.

The rubber composition is also caused to be cross-linkable by the addition and incorporation of a suitable vulcanizing agent, possibly and preferably associated to suitable activators and vulcanization accelerators.

The vulcanizing agent of most advantageous use if sulfur or sulfur-containing molecules (sulfur donors), with accelerators and activators well known to those skilled in the art.

Zinc compounds, and in particular ZnO, $ZnCO_3$, zinc salts of fatty acids, either saturated on unsaturated, having 8 to 18 carbon atoms, such as for instance zinc stearate, directly formed in the rubber composition starting from ZnO and a fatty acid, as well as BiO, PbO, $Pb_3O_4$, $PbO_2$, and mixtures thereof, have proved to be particularly effective.

According to a second aspect of the invention, a tread for vehicle tires is provided, in particular a premolded tread for covering worn tires having a low rolling resistance as defined in attached claim 13.

For the purposes of the invention, such tread comprises the ingredients and has the characteristics described above with reference to the tire according to the present invention.

Such tread is obtainable starting from a rubber composition including the aforementioned vulcanized polymer base, by means of processes and apparatuses known per se.

According to a further aspect of the invention, a method is provided for reducing the rolling resistance of a tire, said tire being provided with a belt structure coaxially extending around a carcass structure and a tread, coaxially extending around the belt structure and being externally provided with a rolling surface designed to get in touch with the ground, which is characterized in that the tire is provided with a tread having a low rolling resistance as defined above.

DETAILED DESCRIPTION OF EXEMPLARY EMBODIMENTS

Additional features and advantages of the invention will be more readily apparent from the following description of some examples of tires according to the invention, made—by way of non limiting indication—with reference to the attached drawing, whose only figure shows a cross-section of a tire according to the present invention.

DETAILED DESCRIPTION OF PREFERRED EMBODIMENTS

Figure 1:
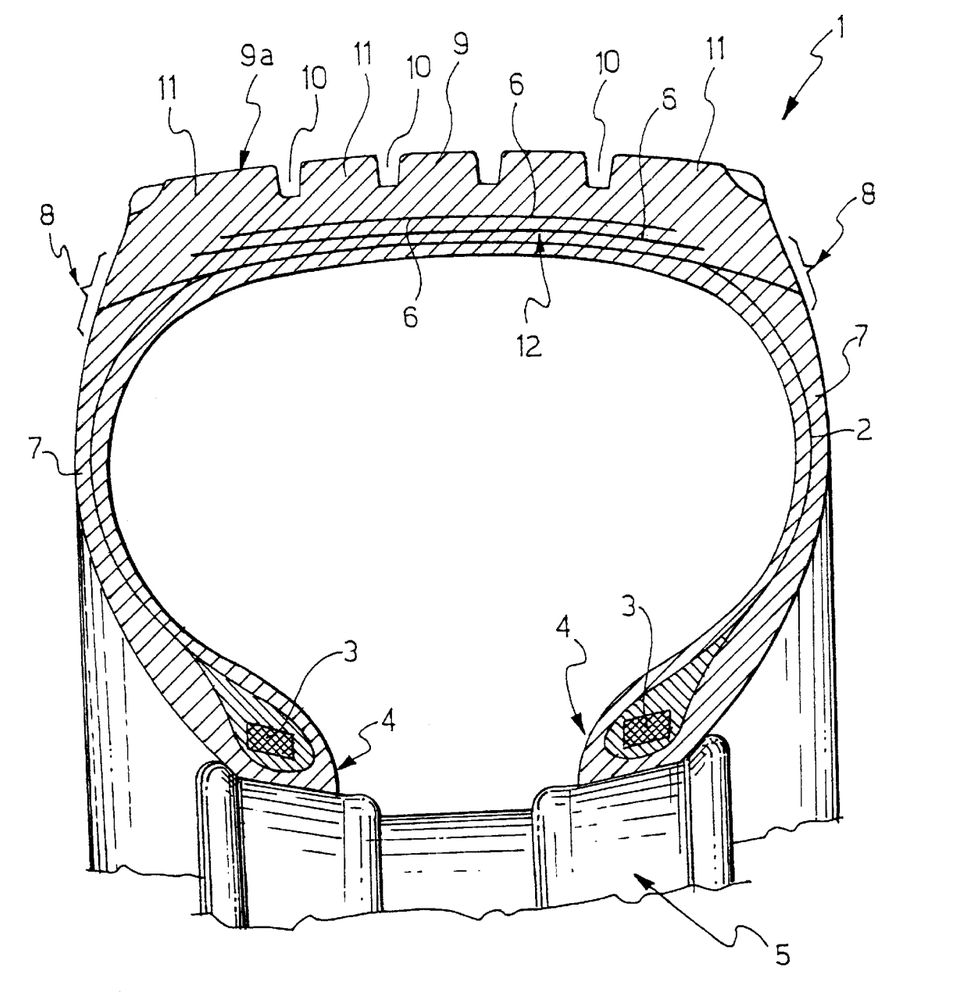

With reference to such figure, a tire 1 conventionally comprises at least one carcass ply 2 whose opposite side edges are externally bent around bead wires 3, incorporated each in a bead 4, defined along an internal circumferential edge of the tire, wherein the tire itself engages on a wheel rim 5 of a vehicle.

Along the circumferential development of the carcass ply 2 a belt structure 12 is applied comprising one or more belt strips 6 made of textile or metal cords incorporated into a rubber sheet.

Externally to the carcass ply 2, in respective opposite side portion thereof, a couple of sidewalls 7 are applied, each of which extends from the bead 4 up to a so-called "shoulder" zone 8 of the tire, defined at the opposite ends of the belt structure 12.

Onto the belt structure 12 a tread 9 is circumferentially applied whose side edges end at the shoulders 8, joining with the sidewalls 7. The tread 9 has an external rolling surface 9a, suitable to get in touch with the ground, wherein circumferential grooves 10 may be obtained, spaced by transversal grooves, not shown in the attached figure, which define a plurality of tread blocks 11 variously distributed along said rolling surface 9a.

The above described tire 1 may be manufactured by means of a process including a plurality of production steps, conventional in themselves and known in the art.

More particularly, such process comprises the steps of preliminarly and independently preparing several semi-finished products corresponding to the different parts of the tire (carcass plies, belt strips, bead wires, beads, fillings, sidewalls and treads) which are successively assembled with one another by a suitable assembling machine.

The subsequent vulcanization step then welds together the above semi-finished products to form a monolithic block, i.e. the tire.

Clearly, the step of preparing the above semi-finished products is preceded by a step of preparing and forming the corresponding rubber compositions.

In the tires of the invention, the tread 9 is produced by forming a vulcanizable rubber composition of the type described above.

The top capping or covering of a worn tire instead may be carried out, in a manner known per se, according to two different methods known as hot covering or cold covering.

In both cases, the worn tire is prepared by removing the tread up to the belt structure on which a suitable rubber composition sheet is applied.

In hot covering, the tread is made of crude rubber composition and is irreversibly linked to the belt structure in a suitably shaped vulcanization mold that also has the function of generating the desired tread pattern.

In cold covering, the tread is made of a rubber composition already vulcanized and already bearing the tread pattern, and is irreversibly linked to the belt structure in an autoclave.

In the following examples, solely given by way of non limitative indication, some formulations of rubber compositions and tires according to the invention and some comparative tests which both the tires of the invention and conventional tires have been subjected to, will now be provided.

EXAMPLE 1

Invention

In a closed rotor mixer (Banbury) model 11D of the company POMINI, which had been caused to rotate at a speed of about 40 r.p.m., the following ingredients were charged in sequence:

S-SBR-A=oil-extended butadiene/styrene copolymer, prepared in solution, having a styrene content of 20% by weight, an oil content of about 27.3% by weight and a vinyl groups content of 60% by weight, commercially available under the trade name BUNA VSL™ 5025-1 HM (Bayer);

BR=polybutadiene, commercially available under the trade name EUROPRENE™ NEOCIS (Enichem);

$SiO_2$ B=silica in the form of substantially spherical beads commercially available under the trade name Zeosil™ 1115 MP (Rhône-Poulenc) having a mean aggregate size of 186 nm as measured by photon correlation spectroscopy;

solid silane coupling agent including 50% carbon black, 50% bis(3-triethoxysilylpropyl)tetrasulfide=X50S (Degussa);

stearic acid, aromatic type oil as plasticizer, as well as other ingredients of common use in smaller amounts.

The so charged ingredients of the rubber composition were then submitted to intimate mixing for an overall duration of this first step of about 5 minutes.

During mixing, the mechanical work imparted to the rubber composition was controlled so as to keep its temperature at about 150°–155° C.

In this way, a rubber composition was obtained wherein silica resulted to be homogeneously dispersed.

After cooling at ambient temperature, the rubber composition thus obtained was charged in a closed rotor mixer, model 11D of the company POMINI, together with the following ingredients:

age-retarding agents and antioxidants of a known type, in amounts easily determinable by a man skilled in the art;

zinc oxide.

Also in this case, the rotors of the mixer were caused to rotate at about 40 r.p.m., so as to submit the rubber composition and the coupling agent to an intimate mixing, keeping the temperature of the rubber composition at a value of about 135° C.

After about 4 minutes of mixing, the rubber composition was discharged and, after cooling at room temperature, mixed with a vulcanization system comprising sulfur and vulcanization accelerators known per se in the art [diphenylguanidine DPG (Monsanto) and SANTOCURE™ NS (Monsanto)] in the same closed rotor mixer (Banbury) model 11D of the company POMINI, which was caused to rotate at about 20 r.p.m.

The rubber composition was then submitted to intimate mixing in order to disperse the vulcanizing system.

After about 4 minutes of mixing, taking care to keep the temperature of the rubber composition at a value of about 100° C., a vulcanizable rubber composition was discharged that had the composition shown in Table I below.

In such a Table, the parts of each ingredients are reported as parts by weight per 100 parts by weight of polymer base (phr).

Table II below shows instead the surface area characteristics of the used silica.

EXAMPLE 2

Invention

According to the procedure described in the preceding Example 1, a rubber composition was prepared including:

S-SBR-A=oil-extended butadiene/styrene copolymer, prepared in solution, having a styrene content of 20% by weight, an oil content of about 27.3% by weight and a vinyl groups content of 60% by weight, commercially available under the trade name BUNA VSL™ 5025-1 HM (Bayer);

BR=polybutadiene, commercially available under the trade name EUROPRENE™ NEOCIS (Enichem);

$SiO_2$ B=silica in the form of substantially spherical beads commercially available under the trade name Zeosil™ 1115 MP (Rhône-Poulenc) having a mean aggregate size of 186 nm as measured by photon correlation spectroscopy;

carbon black N121 (Cabot);

solid silane coupling agent including 50% carbon black, 50% bis(3-triethoxysilylpropyl)tetrasulfide=X50S (Degussa);

stearic acid, aromatic type oil as plasticizer, zinc oxide, sulfur and vulcanization accelerators known in the art.

The resulting composition is shown in Table I below.

Table II below shows instead the surface area characteristics of the used silica.

EXAMPLE 3

Invention

According to the procedure described in the preceding Example 1, a rubber composition having the same composition of this example was prepared except for the type of silica employed.

In particular, the following silica was used:

$SiO_2$ C=silica in the form of substantially spherical beads, commercially available under the trade name Zeosil™ 1135 MP (Rhône-Poulenc) having a mean aggregate size of 186 nm as measured by photon correlation spectroscopy.

The resulting composition is shown in Table I below.

Table II below shows instead the surface area characteristics of the used silica.

EXAMPLE 4

Comparison

According to the teaching of European patent EP 0 501 227, a rubber composition containing silica having a high surface area was prepared and in particular the following silica was used:

SiO$_2$ A=silica commercially available under the trade name Zeosil™ 1165 MP (Rhône-Poulenc).

The resulting composition is shown in Table I below.

Table II below shows instead the surface area characteristics of the used silica.

EXAMPLE 5

Comparison

According to the procedure described in the preceding Example 1, a rubber composition identical to the composition of example 2 was prepared except being made for the type of silica employed.

In particular, the following silica was used:

SiO$_2$ A=silica commercially available under the trade name Zeosil™ 1165 MP (Rhône-Poulenc).

The resulting composition is shown in Table I below.

Table II below shows instead the surface area characteristics of the used silica.

EXAMPLE 6

Determination of the Projected Area of Silica Aggregates

The average projected area of silica aggregates before incorporation into the polymer base was measured according to Standard ASTM D 3849 adapted to the specific character of the silica, by deagglomerating the silica by crushing a paste formed from 100 mg of dry silica powder and 0.5 ml of glycerin and then diluting that paste in 300 ml of water at a pH of 3.

The results of said measurements are shown in Table II below.

The average projected area of silica aggregates after incorporation into the polymer base was measured as follows.

A sample of each of the rubber compositions according to the preceding Examples 1–5 was vulcanized for about 10' at 170° C. by means of a vulcanizing mold known per se, and then to a test to measure the projected area of silica aggregates (APA) in the vulcanized polymer base.

Also in this case, the test was carried out according to Standard ASTM D 3849.

In particular, the silica obtained by pyrolysis from each sample of rubber composition was dispersed according to procedure B of such standard, and then analyzed by means of an electron microscope. More precisely, three samples were collected from each dispersion and placed, one at a time, on an electron microscope copper grid coated with a polyvinylformal film.

The average projected area of silica aggregates for each sample of rubber composition wad determined by coupling a transmission electron microscope with an image scanner, both of them conventional per se.

The results of said tests are shown in Tables III and IV below, for the rubber compositions comprising 100% silica as reinforcing filler and for the compositions comprising both silica and carbon black, respectively.

Such results show that the rubber compositions of the invention (Examples 1–3) have APA values higher than 9000 nm$^2$, while the comparison rubber compositions of Examples 4 and 5 have APA values lower than 8500 nm$^2$.

EXAMPLE 7

Determination of the Dispersion of Silica-Based Reinforcing Fillers

A sample of each of the rubber compositions according to the preceding Examples 1–5 was submitted to vulcanization for about 10' at 170° C. by means of a vulcanizing mold known per se, and then to several tests, in order to evaluate the characteristics of dispersion homogeneity of the reinforcing fillers.

Such evaluation was carried out by analyzing a thin section (thickness: 1 μm) of each of the samples of vulcanized rubber composition with a POLYVAR MET optical microscope, provided with a Sony mono-CCD telecamera.

The dispersion index (D%) of silica is determined based on the number of particles of dispersed filler. Conventionally a filler is considered as "dispersed" when it is aggregated in particles having a diameter smaller than 7 μm.

The dispersion index was calculated according to the following formula:

$$D\% = \left(1 - 0,4 * \frac{V}{L}\right) * 100 \qquad (1)$$

wherein:

$$V = \frac{A}{A_{tot}} * 100 \qquad (2)$$

$$L = \frac{d_c}{d_f} * F\% \qquad (3)$$

A=total area of non dispersed particles;
$A_{tot}$=total area of the section examined;
$d_c$=density of the rubber composition;
$d_f$=density of the silica;
F%=percentage by weight of silica comprised in the composition.

The factor 0.4 in formula (1)—usually referred to as "swelling factor"—is an empirical parameter that provides a measure of the amount of silica which is actually comprised in the non dispersed aggregates, taking into account that some "trapped" polymer is present in such aggregates. If silica should not be easily discernible per se from the surrounding polymer matrix, in particular when an optical microscope is used, a small amount of a suitable contrast agent, such as carbon black, may be added to the silica.

Further details on the determination of the dispersion index of silica as reinforcing filler are to be found, for instance, in B. R. Richmond, *Carbon Black Dispersion Measurement. Part II. Influence of Dispersion on Physical Properties*, Meeting of the Rubber Division, ACS, Oct. 26–29, 1993.

The values of silica dispersion index are shown in Tables III and IV below for the rubber compositions including 100% silica as reinforcing filler and for the rubber compositions including both silica and carbon black, respectively.

The tests carried out proved that both for the rubber compositions of Examples 1–3 (invention) and the rubber compositions of Examples 4 and 5 (comparison) the percentage of silica forming aggregates of a size greater than 7 μm was lower than 1%. Such result confirms therefore that, contrary to the constant teaching of the prior art, it is possible to obtain an excellent silica dispersion in the polymer base also employing silica having a low surface areas, such as to have an APA value greater than 8500 nm$^2$.

EXAMPLE 8

Determination of the Dynamic Properties of the Rubber Composition

A sample of each of the rubber compositions according to the preceding Examples 1–5 was submitted to vulcanization for about 10' at 170° C. by means of a vulcanizing mold known per se, and then to several tests, in order to evaluate the dynamic properties of the same.

More particularly, the tanδ values were determined according to the experimental methods described hereafter and using commercially available apparatuses of the company INSTRON.

The tanδ values were determined by submitting a cylindrical test piece of vulcanized rubber composition having a length of 25 mm and a diameter of 14 mm, subjected to compression preloading up to a longitudinal deformation of 25% of the original height, and kept at a predetermined temperature (0° or 70° C.), to a dynamic sinusoidal deformation having a maximum width of ±3.50% of the height under preloading, with a frequency of 100 cycles per second (100 Hz).

Considering that—based on the tests carried out—the higher the value of tanδ measured at 0° C. the better the wet skid resistance of the tire, and that, the lower the value of tanδ measured at 70° C. the lower the rolling resistance, it is easy to infer from the data of Table III that the rubber compositions of the invention comprising silica as only reinforcing filler (Examples 1 and 3) achieve:

a) at least acceptable characteristics of wet skid resistance, and b) improved characteristics of rolling resistance with respect to the comparison rubber composition of Example 4 and, from the data of Table IV, that the rubber composition of Example 2, comprising carbon black and silica having a low surface area, achieves at least acceptable characteristics of wet skid resistance and improved characteristics of rolling resistance with respect to the comparison rubber composition of Example 5.

EXAMPLE 9

Determination of the Abradibility Characteristics of the Rubber Composition

A sample of each of the rubber compositions according to the preceding Examples 1–5 was submitted to vulcanization by means of a vulcanizing mold known per se, and then to several tests, in order to evaluate the abradibility characteristics of the same.

The tests were carried out according to ISO standard 4649.

Following the abradibility test, the amount, in $mm^3$, of removed material was measured for each sample obtained from the rubber compositions of Examples 1–5.

In particular, the volume of material abraded from each sample was evaluated against a sample obtained from a standard rubber composition. Such standard rubber composition is described in the aforementioned norm.

The volume loss is calculated according to the following relation:

$$\Delta V = Vt * \frac{200}{ms} \quad (4)$$

wherein:

Vt is the volume, in $mm^3$, removed from the test sample, ms is the weight loss, in mg, of the standard rubber composition, 200 is the theoretical abrasion value, in mg, of the standard rubber composition.

In other words, the greater the abradibility value of the test, the lower the abrasion resistance of the tested sample of rubber composition with respect to the standard rubber composition.

The results of the tests carried out are shown in Tables III and IV below for the rubber compositions including 100% silica as reinforcing filler and for the rubber compositions including both silica and carbon black, respectively.

An examination of the data reported in said Tables shows in particular that the rubber compositions of the invention wherein silica having a low surface area was used—i.e. silica of the 1115 MP type (Examples 1 and 2)—show better characteristics of abrasion resistance with respect to the other compositions.

Therefore, the rubber compositions of the invention are suitable to comply with the strictest abradibility properties required to a tread for vehicle tires.

EXAMPLE 10

Road Behavior and Rolling Resistance

With the rubber compositions obtained according to the preceding Examples 1–5, several treads were produced by drawing in conventional apparatuses. In particular, the treads obtained starting from the rubber compositions comprising silica as only reinforcing filler, were subsequently used to assemble tires having the size 205/65R15, while the treads obtained starting from rubber compositions comprising both silica and carbon black as reinforcing fillers were used to assemble tires having the size 175/65R14.

The tires so obtained were then submitted to standard tests, to evaluate their rolling resistance, road holding on wet and dry grounds, and the kilometric yield.

A. Evaluation of Rolling Resistance

This evaluation was carried out on each tire according to ISO standards 8767 and in particular the so-called "Torque Method", reported under point 7.2.2 of the same, using conventional laboratory apparatuses.

The measurements were carried out at a constant speed of 80 km/h, while parasitic losses were measured according to the "Skim Reading" method reported under point 6.6.1 of the aforesaid ISO standards 8767.

In order to compare the rubber compositions of the invention with those of the prior art, a rolling resistance index of 100 was attributed to the power loss in kg/t measured for the tires obtained starting from the rubber compositions of Examples 4 and 5.

Afterwards, the power losses of the tires obtained starting from the rubber compositions of Examples 1–3 were measured, ascribing a % increase in the index the lower was the power loss measured during the test.

In other words, the higher the index value, the lower the rolling resistance of the tire examined.

The results of the test carried out are shown in Tables V and VI below for the rubber compositions including 100% silica as reinforcing filler and for the rubber compositions including both silica and carbon black, respectively.

An examination of the data reported in said Tables shows that the tires of the invention (Examples 1–3) have an improved rolling resistance with respect to that showed by the tires of the prior art (Examples 4 and 5).

B. Evaluation of Road Behavior

This evaluation was carried out at the test track of Vizzola, mounting the tires on cars model BMW 328-i.

During the tests carried out, the performances of the tires obtained starting from the rubber compositions of Examples 1–3 were compared with those of tires of the prior art (Examples 4 and 5).

The tires were tested by two independent test drivers, in order to evaluate, in particular, the road holding on wet and dry ground and the kilometric yield. The results of the tests carried out are shown in Tables V and VI below for the rubber compositions including 100% silica as reinforcing filler and, respectively, for the rubber compositions including both silica and carbon black, a value of 100 being attributed to the results obtained with the comparison tires.

As it may be inferred from the said Tables, the performances of the tires of the invention (Examples 1–3) are entirely comparable to those of the comparison tires (Examples 4 and 5).

TABLE I

| Ingredients | Ex. 1 | Ex. 2 | Ex. 3 | Ex. 4 | Ex. 5 |
|---|---|---|---|---|---|
| S-SBR A | 75 | 75 | 75 | 75 | 75 |
| BR | 25 | 25 | 25 | 25 | 25 |
| Plasticizer | 5 | 8 | 5 | 5 | 8 |
| SiO2 1165MP | — | — | — | 63 | 35 |
| SiO2 1135MP | — | — | 63 | — | — |
| SiO2 1115MP | 63 | 35 | — | — | — |
| Carbon black | — | 22 | — | — | 22 |
| X 50 S | 10 | 7.4 | 10 | 10 | 7.4 |
| Accelerators | 2.8 | 2.3 | 2.8 | 2.8 | 2.3 |
| Sulfur | 1.2 | 1.4 | 1.2 | 1.2 | 1.4 |
| Stearic acid | 2 | 2 | 2 | 2 | 2 |
| Zinc oxide | 2.5 | 2.5 | 2.5 | 2.5 | 2.5 |

TABLE II

|  | Zeosil ™1165 | Zeosil ™1135 | Zeosil ™1115 |
|---|---|---|---|
| BET (m²/g) | 161 | 125 | 100 |
| CTAB (m²/g) | 160 | 125 | 95 |
| APA [nm²]* | 9900 | 11000 | 11500 |

*as measured before incorporation into the polymer base

TABLE III (100% silica rubber composition)

|  | Ex. 1 (Inv.) | Ex. 3 (Inv.) | Ex. 4 (Comp.) |
|---|---|---|---|
| tanδ 0° C. | 0.595 | 0.560 | 0.591 |
| tanδ 23° C. | 0.282 | 0.295 | 0.300 |
| tanδ 70° C. | 0.120 | 0.125 | 0.140 |
| DIN abrasion [mm³] | 72 | 80 | 80 |
| D [%] | 99.70 | 99.50 | 99.30 |
| APA [nm²]** | 10860 | 10000 | 8000 |

**as measured after incorporation into the polymer base

TABLE IV (silica/carbon black rubber compositions)

|  | Ex. 2 (Inv.) | Ex. 5 (Comp.) |
|---|---|---|
| tanδ 0° C. | 0.590 | 0.598 |
| tanδ 23° C. | 0.326 | 0.346 |
| tanδ 70° C. | 0.158 | 0.176 |
| DIN abrasion [mm³] | 76 | 88 |
| D [%] | 99.28 | 99.05 |
| APA [nm²]** | 11653 | 8200 |

**as measured after incorporation into the polymer base

TABLE V (100% silica rubber compositions)

|  | Ex. 1 (Inv.) | Ex. 3 (Inv.) | Ex. 4 (Comp.) |
|---|---|---|---|
| Road grip on wet ground | 98 | 100 | 100 |
| Road grip on dry ground | 98 | 100 | 100 |
| Rolling resistance | 112 | 108 | 100 |
| Yield (km) | 98 | 99 | 100 |

TABLE VI (silica/carbon black rubber compositions)

|  | Ex. 2 (Inv.) | Ex. 5 (Comp.) |
|---|---|---|
| Road grip on wet ground | 99 | 100 |
| Road grip on dry ground | 100 | 100 |
| Rolling resistance | 109 | 100 |
| Yield (km) | 100 | 100 |

What is claimed is:

1. A low rolling resistance tire for vehicles, comprising:
   a carcass structure;
   a belt structure coaxially extending around the carcass structure; and
   a tread coaxially extending around the belt structure and being externally provided with a rolling surface designed to contact the ground;
   wherein the tread comprises a vulcanized polymer base comprising at least a first silica-based reinforcing filler, and wherein the first silica-based reinforcing filler has:
      an average projected area of aggregates, measured before incorporation into the polymer base, lower than 20,000 nm²;
      a dispersion index in the polymer base greater than or equal to 97%; and
      an average projected area of the aggregates, measured after incorporation into the polymer base, greater than or equal to 8,500 nm² and less than or equal to 18,000 nm².

2. The tire of claim 1, wherein the first silica-based reinforcing filler has a Brunauer, Emmett, and Teller ("BET") surface area, measured according to International Organization for Standardization ("ISO") standard 5794/1, less than or equal to 130 m²/g, and
   wherein the first silica-based reinforcing filler has a surface area, measured by cetyltrimethylammonium bromide ("CTAB") adsorption according to ISO standard 6810, greater than or equal to 80 m²/g and less than or equal to 130 m²/g.

3. The tire of claim 1, wherein the first silica-based reinforcing filler is a silica in a form of substantially-spherical beads.

4. The tire of claim 1, wherein the first silica-based reinforcing filler has a mean aggregate size, measured by photon correlation spectroscopy, lower than 350 nm.

5. The tire of claim 1, wherein the polymer base further comprises a second silica-based reinforcing filler having a BET surface area, measured according to ISO standard 5794/1, greater than or equal to 130 m²/g and less than or equal to 200 m²/g, and wherein the second silica-based reinforcing filler has a surface area, measured by CTAB adsorption according to ISO standard 6810, greater than or equal to 130 m²/g and less than or equal to 200 m²/g.

6. The tire of claim 1 or 5, wherein a total amount of silica-based reinforcing filler is greater than or equal to 20 parts-by-weight and less than or equal to 120 parts-by-weight per 100 parts-by-weight of the polymer base.

7. The tire of claim 5, wherein a minimum amount of the first silica-based reinforcing filler is at least 50% by weight of a total amount of silica-based reinforcing filler.

8. The tire of claim 1, wherein the polymer base further comprises an additional reinforcing filler selected from the group consisting of: carbon black, alumina, aluminosilicates, calcium carbonate, and kaolin.

9. The tire of claim 1, wherein the polymer base further comprises a carbon-black-based reinforcing filler in an amount greater than or equal to 0 parts-by-weight and less than or equal to 100 parts-by-weight per 100 parts-by-weight of the polymer base.

10. The tire of claim 9, wherein a weight ratio between an amount of silica-based reinforcing filler and the amount of carbon-black-based reinforcing filler is greater than or equal to 0.5:1 and less than or equal to 15:1.

11. The tire of claim 1, wherein the polymer base includes unsaturated-chain polymers or copolymers, either natural or synthetic,
wherein, if present, the synthetic polymers are obtained by solution or emulsion polymerization of conjugated dienes, and
wherein, if present, the synthetic copolymers are obtained by one or more of:
solution or emulsion polymerization of conjugated dienes and aliphatic vinyl monomers;
solution or emulsion polymerization of conjugated dienes and aromatic vinyl monomers; and
solution or emulsion polymerization of conjugated dienes and aliphatic vinyl monomers and aromatic vinyl monomers.

12. The tire of claim 11, wherein the polymer base includes at least 30% by weight of a butadiene/styrene copolymer prepared in solution ("S-SBR") on a total dry weight of the polymer base.

13. The tire of claim 11, wherein at least one copolymer is a copolymer comprising silane groups having a glass transition temperature greater than or equal to −50° C., obtained by polymerizing, in a presence of an organic metal initiator, 1,4-butadiene or a 1,4-butadiene/styrene copolymer with a silane compound having a following structural formula:

$$X_i\!-\!Si\!-\!(OR)_j\!-\!R'_{4-i-j m} \ (I)$$

wherein X is a halogen atom selected from the group consisting of chlorine, bromine, and iodine;
wherein R and R' are, independently, an alkyl group, an aryl group, a vinyl group, or a halogenated alkyl group, having from 1 to 20 carbon atoms; and
wherein j is an integer greater than or equal to 1 and less than or equal to 4, i is an integer greater than or equal to 0 and less than or equal to 2, and a sum of i and j is greater than or equal to 2 and less than or equal to 4.

14. A low rolling resistance tread for vehicle tires, comprising:
a vulcanized polymer base comprising at least a first silica-based reinforcing filler, wherein the first silica-based reinforcing filler has:
an average projected area of aggregates, as measured before incorporation into the polymer base, lower than 20,000 nm²;
a dispersion index in the polymer base greater than or equal to 97%; and
an average projected area of the aggregates, measured after incorporation into the polymer base, greater than or equal to 8,500 nm² and less than or equal to 18,000 nm².

15. The tread of claim 14, wherein the first silica-based reinforcing filler has a BET surface area, measured according to ISO standard 5794/1, less than or equal to 130 m²/g, and
wherein the first silica-based reinforcing filler has a surface area, measured by CTAB adsorption according to ISO standard 6810, greater than or equal to 80 m²/g and less than or equal to 130 m²/g.

16. The tread of claim 14, wherein the first silica-based reinforcing filler is a silica in a form of substantially-spherical beads.

17. The tread of claim 14, wherein the first silica-based reinforcing filler has a mean aggregate size, measured by photon correlation spectroscopy, lower than 350 nm.

18. The tread of claim 14, wherein the polymer base further comprises a second silica-based reinforcing filler having a BET surface area, measured according to ISO standard 5794/1, greater than or equal to 130 m²/g and less than or equal to 200 m²/g, and
wherein the second silica-based reinforcing filler has a surface area, measured by CTAB adsorption according to ISO standard 6810, greater than or equal to 130 m²/g and less than or equal to 200 m²/g.

19. The tread of claim 14 or 18, wherein a total amount of silica-based reinforcing filler is greater than or equal to 20 parts-by-weight and less than or equal to 120 parts-by-weight per 100 parts-by-weight of the polymer base.

20. The tread of claim 18, wherein a minimum amount of the first silica-based reinforcing filler is at least 50% by weight of a total amount of silica-based reinforcing filler.

21. The tread of claim 14, wherein the polymer base further comprises a carbon-black-based reinforcing filler.

22. The tread of claim 21, wherein the carbon-black-based reinforcing filler is greater than or equal to 0 parts-by-weight and less than or equal to 100 parts-by-weight per 100 parts-by-weight of the polymer base.

23. The tread of claim 22, wherein a weight ratio between an amount of silica-based reinforcing filler and an amount of carbon-black-based reinforcing filler is greater than or equal to 0.5:1 and less than or equal to 15:1.

24. The tread of claim 14, wherein the polymer base includes unsaturated-chain polymers or copolymers, either natural or synthetic,
wherein, if present, the synthetic polymers are obtained by solution or emulsion polymerization of conjugated dienes, and
wherein, if present, the synthetic copolymers are obtained by one or more of:
solution or emulsion polymerization of conjugated dienes and aliphatic vinyl monomers;
solution or emulsion polymerization of conjugated dienes and aromatic vinyl monomers; and
solution or emulsion polymerization of conjugated dienes and aliphatic vinyl monomers and aromatic vinyl monomers.

25. The tread of claim 24, wherein the polymer base includes at least 30% by weight of a butadiene/styrene copolymer prepared in solution ("S-SBR") on a total dry weight of the polymer base.

26. The tread of claim 24, wherein at least one copolymer is a copolymer comprising silane groups having a glass transition temperature greater than or equal to −50° C. obtained by polymerizing, in a presence of an organic metal initiator, 1,4-butadiene or a 1,4-butadiene/styrene copolymer with a silane compound having a following structural formula:

$$X_i\text{—Si—}(OR)_j\text{—}R'_{4-i-jtm}\ (I)$$

wherein X is a halogen atom selected from the group consisting of chlorine, bromine, and iodine;

wherein R and R' are, independently, an alkyl group, an aryl group, a vinyl group, or a halogenated alkyl group, having from 1 to 20 carbon atoms; and wherein j is an integer greater than or equal to 1 and less than or equal to 4, i is an integer greater than or equal to 0 and less than or equal to 2, and a sum of i and j ranges is greater than or equal to 2 and less than or equal to 4.

27. A method for reducing a rolling resistance of a tire, the tire comprising:

a carcass structure;

a belt structure coaxially extending around the carcass structure; and a tread coaxially extending around the belt structure and being externally provided with a rolling surface designed to contact the ground;

the method comprising providing the tire with the tread, comprising:

a vulcanized polymer base comprising at least a first silica-based reinforcing filler, wherein the first silica-based reinforcing filler has:

an average projected area of aggregates, as measured before incorporation into the polymer base, lower than 20,000 $nm^2$;

a dispersion index in the polymer base greater than or equal to 97%; and an average projected area of the aggregates, measured after incorporation into the polymer base, greager than or equal to 8,500 $nm^2$ and less than or equal to 18,000 $nm^2$.

* * * * *

UNITED STATES PATENT AND TRADEMARK OFFICE
CERTIFICATE OF CORRECTION

PATENT NO. : 6,624,233 B2  Page 1 of 1
DATED : September 23, 2003
INVENTOR(S) : Angela Amaddeo et al.

It is certified that error appears in the above-identified patent and that said Letters Patent is hereby corrected as shown below:

Column 17,
Line 49, "$X_i\text{—}Si\text{—}(OR)_j\text{—}R'_{4-i-jtm\,(I)}$" should read
-- $X_i\text{-}Si\text{-}(OR)_j\text{-}R'_{4-i-j}$     (I) --.

Column 19,
Line 5, "$X_i\text{—}Si\text{—}(OR)_j\text{—}R'_{4-i-jtm\,(I)}$" should read
-- $X_i\text{-}Si\text{-}(OR)_jR'_{4-i-j}$     (I) --.

Column 20,
Line 17, "greager than" should read -- greater than --.

Signed and Sealed this

Ninth Day of March, 2004

JON W. DUDAS
*Acting Director of the United States Patent and Trademark Office*